United States Patent [19]

Tatsumi et al.

[11] Patent Number: 4,712,115

[45] Date of Patent: Dec. 8, 1987

[54] THERMAL-TRANSFER PRINTER

[75] Inventors: Hisao Tatsumi; Haruhiko Kayata; Kenji Yamamori, all of Nagoya; Toshio Kakizawa, Kuwana; Toshiaki Mogi, Nagoya, all of Japan

[73] Assignee: Kabushiki Kaisha Toshiba, Kawasaki, Japan

[21] Appl. No.: 860,008

[22] Filed: May 5, 1986

[30] Foreign Application Priority Data

May 10, 1985 [JP] Japan ................................ 60-100325
May 10, 1985 [JP] Japan ................................ 60-100326
May 22, 1985 [JP] Japan ................................ 60-110024

[51] Int. Cl.⁴ .......................... G01D 15/10; B41J 3/20

[52] U.S. Cl. ................................ 346/76 PH; 400/120; 400/218; 400/233

[58] Field of Search .................... 346/76 PH; 400/120, 400/218, 233

[56] References Cited

U.S. PATENT DOCUMENTS 4,564,848 1/1986 Kuzumi .......................... 346/76 PH
4,598,301 7/1986 Suzani et al. .................... 346/76 PH

FOREIGN PATENT DOCUMENTS 56-62167 5/1981 Japan .
57-21471 5/1982 Japan .
57-176181 10/1982 Japan .

*Primary Examiner*—E. A. Goldberg
*Assistant Examiner*—Gerald E. Preston
*Attorney, Agent, or Firm*—Cushman, Darby & Cushman

[57] ABSTRACT

A thermal-transfer printer includes a carriage arranged for reciprocation along a recording paper and a thermal head movable together with the carriage. On the carriage is mounted a ribbon cassette having a pair of reels and repeatedly usable ink ribbon wound on the reels. The reels are rotated to transport the ink ribbon in a desired direction by a ribbon transport mechanism arranged in the carriage. The operation of the transport mechanism is controlled by a control device. The device includes a main control unit for supplying a transport control signal to the mechanism to drive the reels so that the ink ribbon is transported in the direction opposite to the moving direction of the thermal head during printing by the thermal head, and a take-up control signal output circuit for supplying a take-up control signal to the transport mechanism to drive the reels so that the starting end side of the ink ribbon is taken up for a predetermined length at the end of each printing in the advancing direction of the thermal head.

13 Claims, 30 Drawing Figures

FIG. 21
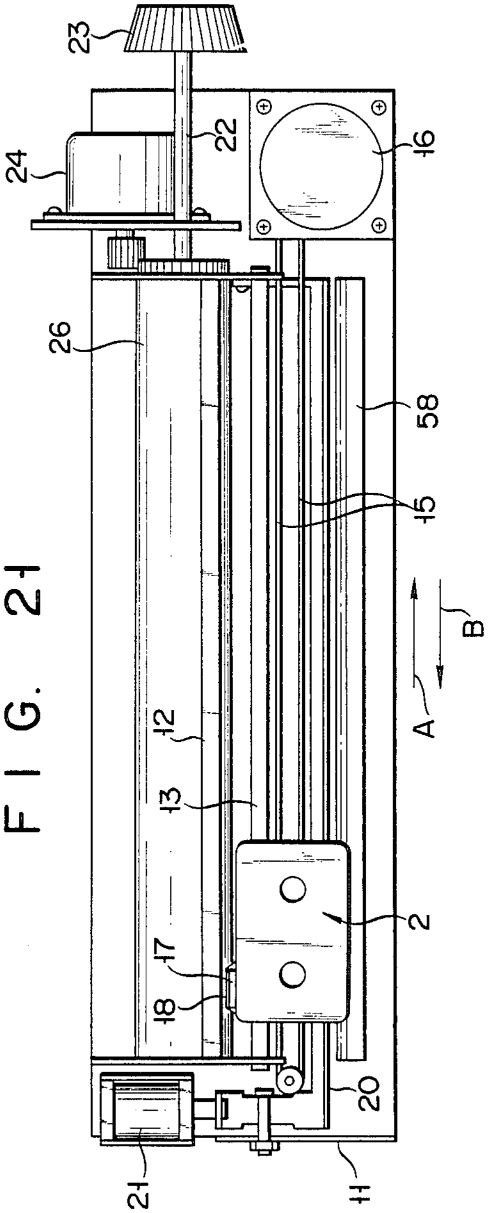
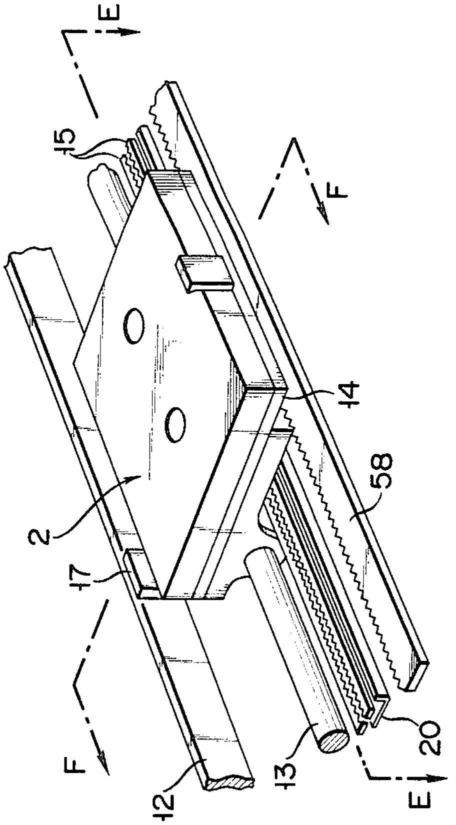
FIG. 22

THERMAL-TRANSFER PRINTER

BACKGROUND OF THE INVENTION

The present invention relates to a thermal-transfer printer for recording information by using a ribbon cassette in which a repeatedly usable ink ribbon is wound on a pair of reels.

As is generally known, the ribbon cassettes used in thermal-transfer printers are no longer unusable once the ink has been transferred thermally from the ribbon to the paper. Therefore, the thermal-transfer printers using the cassettes of this type have a device for rotating one of the reels of the cassette to take up the used portion of the ribbon. The other reel can rotate freely. The printers generally comprise a carriage which can reciprocate along a platen, and a thermal head mounted on the carriage. While the carriage is moving in a predetermined direction, the head is heated and thermally transfers the ink from the ribbon to the printing paper, thus printing one line. In doing this, the ink ribbon is fed in the opposite direction to the aforesaid predetermined direction lest it move relatively to the paper. For this purpose, one of the paired reels is rotated by a drive mechanism provided in the carriage. When the printing of the one line ends, the thermal head is deenergized and separated from the paper. Then, the carriage is moved in the aforesaid opposite direction to be returned to a print start position. Thereafter, the head, along with the carriage, is moved in the predetermined direction for printing of another line while the ribbon is being transported in the opposite direction.

Meanwhile, conventional ink ribbons can be used only once since the ink is entirely transferred to the paper in a single printing operation. Therefore, the ribbon need not be rewound for reuse; it is transported only in one direction as aforesaid.

Recently, there have been developed ink ribbons which are coated with thicker ink film for repeated use, 10 to 20 times. When a ribbon cassette including one such ink ribbon is used in the aforementioned prior art printers, the ribbon wound on one reel must be temporarily rewound on the other, or the cassette must be turned over to relocate the reels every time the entire ribbon has been used for printing. This requires troublesome manual work. Moreover, at the end of printing of every line the thermal head must be returned to the print start position to print the next line. Accordingly, it takes a lot of time to print a multitude of lines.

To cope with this, the thermal head may be energized for printing also during the return of the carriage to the print start position so that the portion of the ink ribbon used to print one line is used also in printing the next line. This operation should be able to be repeated until the frequency limit of repeated use of the same portion of the ribbon is reached. In this case, however, the uses of the ribbon must be counted and memorized, complicating the control of the printer. Moreover, when the printer is disconnected from the power supply before the aforesaid frequency limit is reached, and thereafter the printer is connected to the power supply, the printer must be controlled such that the ribbon is not used beyond the remaining frequency limit. In general, therefore, the printer requires a complicated control circuit and sophisticated control program. Even though the printing time is shortened as a whole, the used portion of the ink ribbon, in the case of continuous printing of a multitude of lines, must be taken up at a stroke when the repeatedly used ribbon portion reaches the frequency limit of use. Thus, the printing operation would often be interrupted for a long time, losing its continuity.

SUMMARY OF THE INVENTION

The present invention is contrived in consideration of these circumstances, and is intended to provide a thermal-transfer printer using an ink ribbon cassette including a repeatedly usable ink ribbon, in which the ribbon can be repeatedly used without turning over or reloading the cassette, thus reducing printing time and permitting continuous printing operation, and in which a are simple.

In order to achieve the above object, according to the present invention, there is provided a thermaltransfer printer which comprises a thermal head disposed for reciprocation along a recording surface of a record medium and adapted, during both advancing and returning strokes, to heat an ink ribbon to thermally transfer ink of the ribbon to the record medium in accordance with input information, thereby printing lines alternately in advancing and returning directions, a ribbon transport mechanism for rotating the reels to transport the ink ribbon in a desired direction, and a control device for supplying a transport control signal to the transport mechanism to transport the ink ribbon in a predetermined direction so that the ribbon should not move relatively to the record medium during the printing, and also supplying a take-up control signal to the transport mechanism so that the starting end of the ribbon is taken up for a predetermined length every time one line or a few lines are printed. Thus, printing can be effected in both the advancing and returning directions, and the used portion of the ribbon can be taken up in regular succession.

BRIEF DESCRIPTION OF THE DRAWINGS

FIGS. 2 to 10 show a printer according to a first embodiment of the present invention, in which FIG. 2 is a plan view of the printer, FIGS. 3 and 4 are a perspective view and a side view, respectively, showing a carriage loaded with the cassette, FIG. 5 is a sectional view taken along line V—V of FIG. 4, FIG. 6 is a sectional view taken along line VI—VI of FIG. 3, FIG. 7 is a circuit diagram of a control device, FIG. 8 is a sectional view of the carriage in a state different from the one shown in FIG. 5, FIGS. 9A, 9B, 9C and 9D are timing charts for illustrating the operation of the control device, and FIG. 10 is a diagram illustrating a ribbon take-up mode;

FIGS. 11 and 12 show a first modification of the control device, in which FIG. 11 is a circuit diagram, and FIG. 12 is a diagram illustrating the ribbon take-up mode;

FIGS. 13 and 14 show a second modification of the control device, in which FIG. 13 is a circuit diagram, and FIG. 14 is a diagram illustrating the ribbon take-up mode;

FIGS. 15 to 20 shown a second embodiment of the invention, in which FIG. 15 is a circuit diagram of a control device, and FIGS. 16 to 20 are diagrams illustrating different ribbon take-up modes;

FIGS. 21 to 26 show a printer according to a third embodiment of the invention, in which FIG. 21 is a plan view of the printer, FIG. 22 is a perspective view showing a carriage loaded with a ribbon cassette and its surroundings, FIG. 23 is a sectional view taken along line E—E of FIG. 22, FIG. 24 is a sectional view taken along line F—F of FIG. 22, and FIGS. 25 and 26 are sectional views showing the carriage in states different from the one shown in FIG. 23.

DETAILED DESCRIPTION OF THE PREFERRED EMBODIMENTS

Preferred embodiments of the present invention will now be described in detail with reference to the accompanying drawings.

Figure 1:
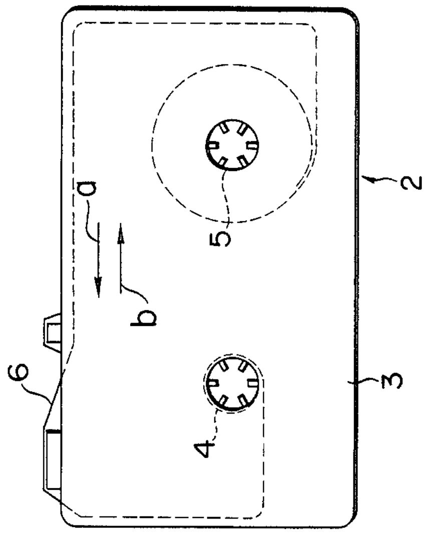
FIG. 1 is a plan view of a ribbon cassette.

Referring now to FIG. 1, there is shown an ink ribbon cassette 2 which is used in a thermal-transfer printer according to the present invention. Cassette 2 has substantially rectangular case 3 in which first and second reels 4 and 5 are mounted for rotation. Reels 4 and 5 are wound with repeatedly usable ink ribbon 6 which can move in the directions indicated by arrows a and b. The unused portion of ribbon 6 on second reel 5 is finally wound on first reel 4.

Figure 2:
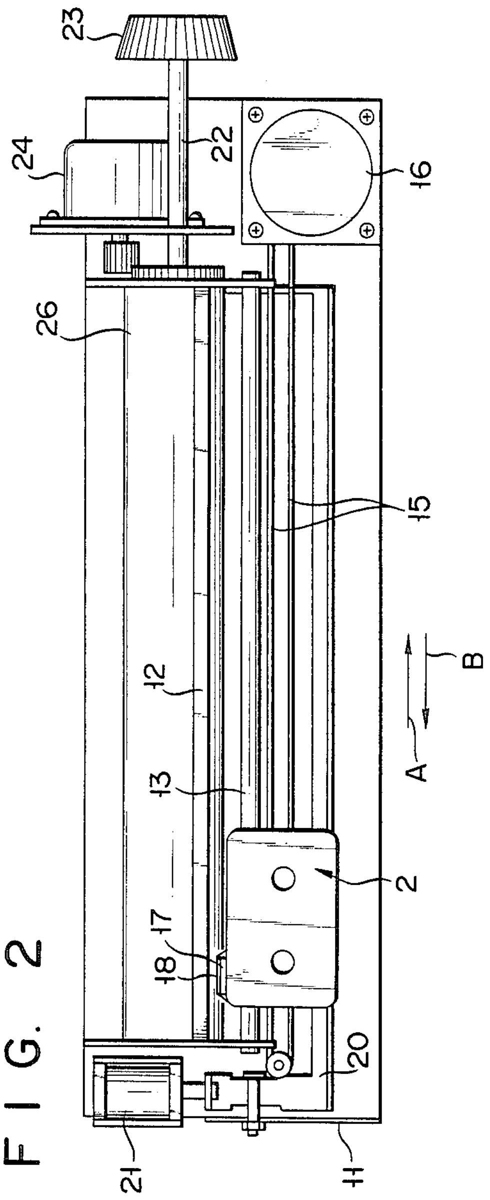
Figure 3:
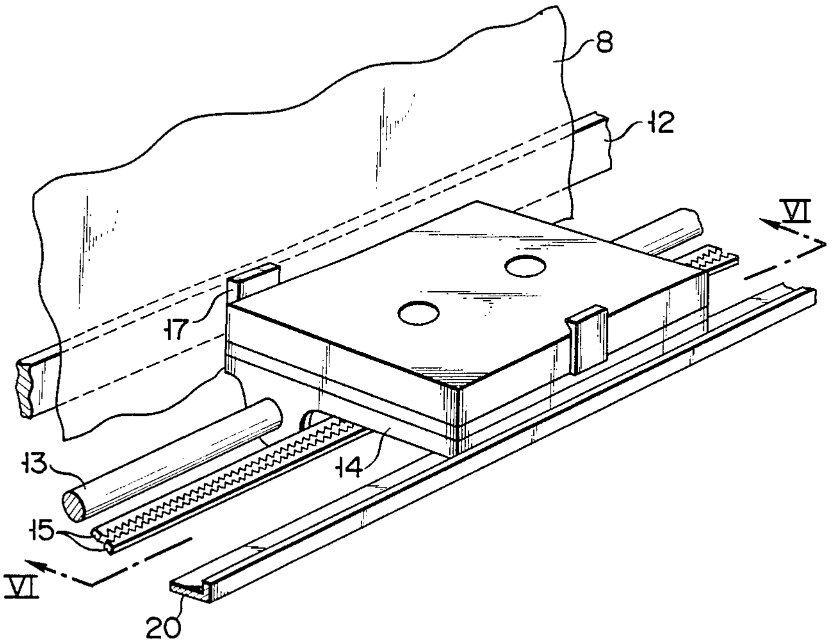
Figure 4:
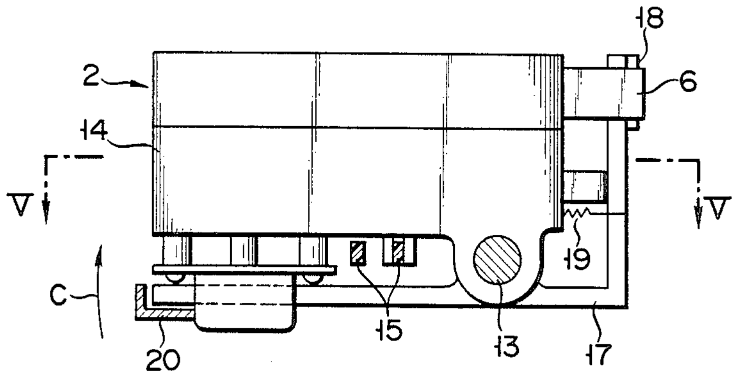

As shown in FIGS. 2, 3 and 4, the printer, loaded with cassette 2 for printing, comprises frame 11 and flat platen 12 fixed thereto. Also, guide rod 13 is fixed to frame 11, extending parallel to platen 12. Carriage 14 is supported on rod 13 so as to be movable along it. Cassette 2 is mounted on carriage 14. Endless belt 15 is stretched parallel to the guide rod. One end of the belt is connected to carriage drive motor 16 which is fixed on frame 11. A part of the belt is coupled to carriage 14. Thus, motor 16 drives belt 15 to move carriage 14 in two opposite directions indicated by arrows A and B. Substantially L-shaped head support plate 17 is rockably attached to carriage 14 so as to move as one with the carriage. Thermal head 18 is fixed to that lateral face of plate 17 which is opposed to platen 12. Thus, head 18 reciprocates together with carriage 14 in the directions of arrows A and B. Support plate 17 is normally urged to move away from platen 12 by spring 19 which is stretched between the plate and carriage 14. Head support plate rocking lever 20 is rockably supported below carriage 14, extending parallel to platen 12. One end of lever 20 is connected to solenoid 21 which is mounted on frame 11. When the solenoid is actuated, lever 20 rocks in the direction of arrow C from the position shown in FIG. 4, thereby causing support plate 17 to rock against the urging force of spring 19. As a result, thermal head 18 is pressed against printing paper 8 (FIG. 3) which is interposed between the head and platen 12. Head 18 is energized for a duration corresponding to an entire line, irrespective of its moving direction. In FIG. 2, numeral 26 designates a paper feed roller extending parallel to the platen; 22, a paper feed shaft coupled to the roller, 23, a manual paper feed knob fixed to the shaft, and 24, a paper feed motor.

The printer is provided with ribbon transport mechanism 30 for transporting ink ribbon 6 of ribbon cassette 2 on carriage 14 in the predetermined directions. Mechanism 30 will now be described in detail.

Figure 5:
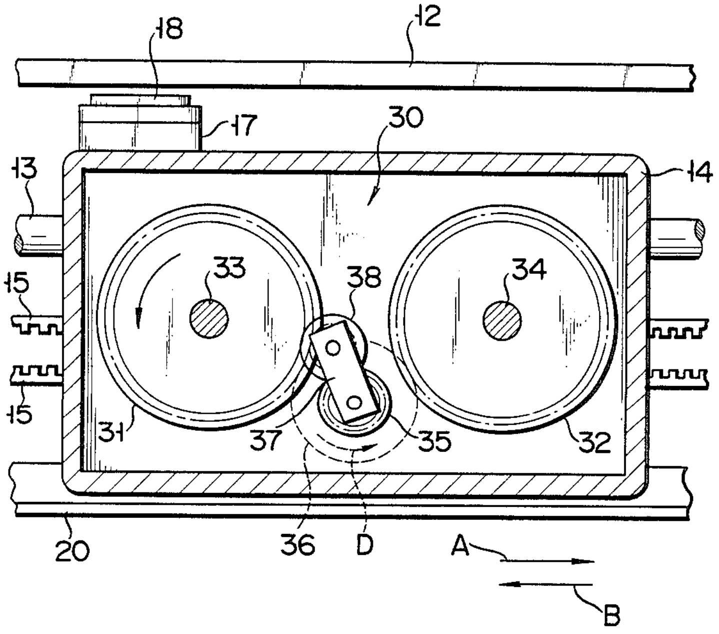
Figure 6:
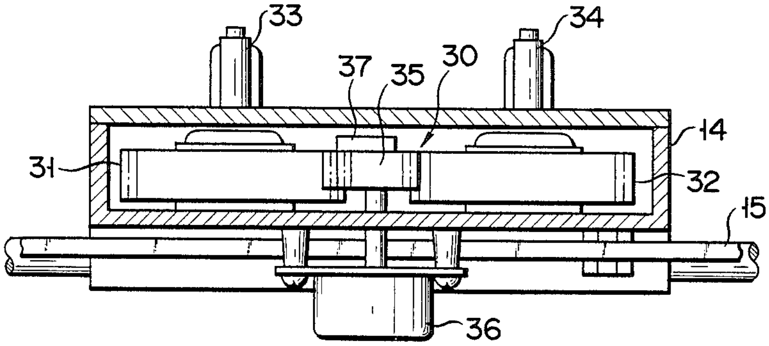
Figure 8:
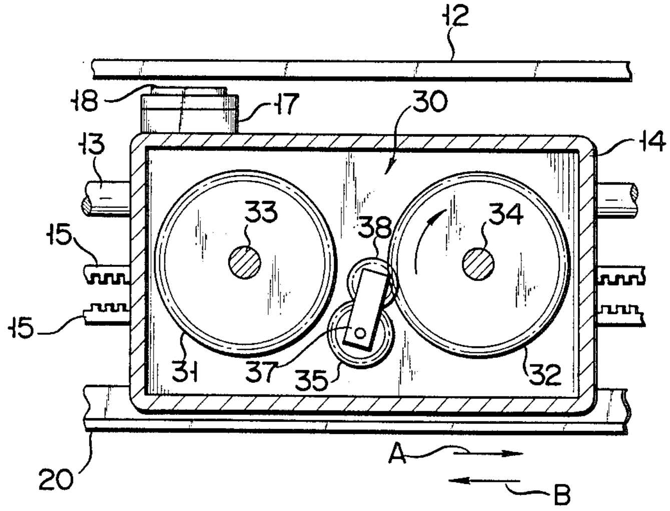

As shown in FIGS. 5 and 6, a pair of reel shafts 33 and 34 stand on carriage 14 for rotation. Inside carriage 14, first and second gears 31 and 32 are fixed to shafts 33 and 34, respectively. When ribbon cassette 2 is set on carriage 14, shafts 33 and 34 engage reels 4 and 5, respectively, of cassette 2. Inside carriage 14, driving gear 35 is disposed at equal distances from gears 31 and 32. Gear 35 is rotated in the forward or reverse direction by ribbon transport motor 36 which is mounted on the outer bottom surface of carriage 14. One end portion of swinging lever 37 is rockably supported by a pivot of gear 35. Intermediate gear 38 is supported on the other end of lever 37 for rotation in mesh with driving gear 35. As carriage 14 moves in the direction of arrow A, motor 36 rotates gear 35 in the direction of arrow D or in the counterclockwise direction. As carriage 14 moves in the direction of arrow B, on the other hand, motor 36 rotates gear 35 clockwise. When driving gear 35 is rotated counterclockwise, as shown in FIG. 5, intermediate gear 38 engages first gear 31 to rotate it counterclockwise, thereby driving first reel 4 of cassette 2. When gear 35 is rotated clockwise, as shown in FIG. 8, gear 38 engages second gear 32 to rotate it clockwise, thereby driving second reel 5 of the cassette.

The printer is further provided with control device 39 for controlling the operation of ribbon transport mechanism 30. Device 39 will now be described in detail.

Figure 7:
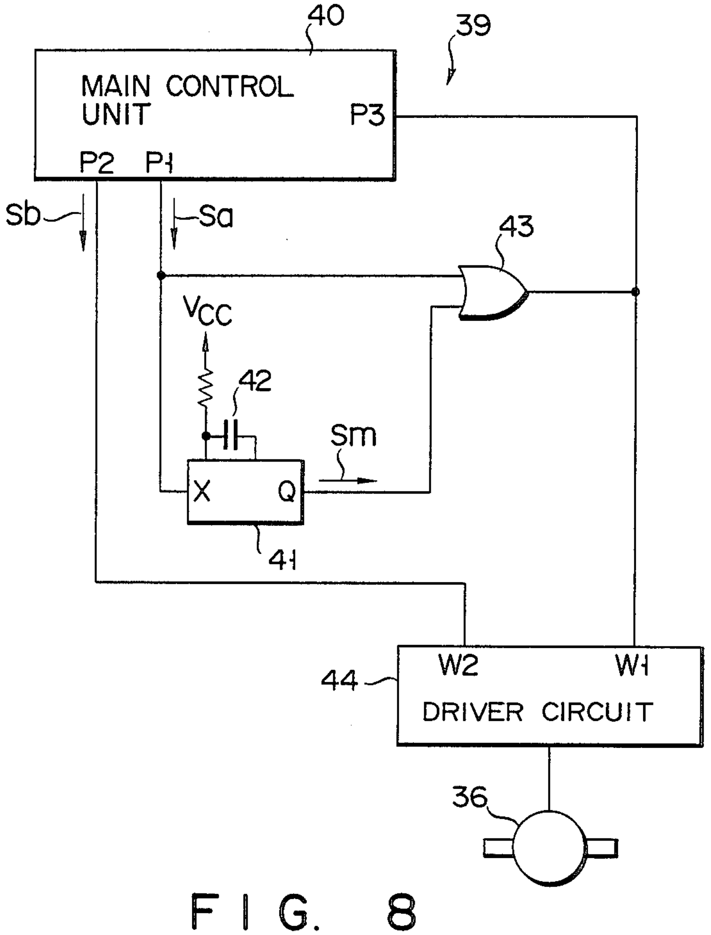

As shown in FIG. 7, control device 39 includes main control unit 40 formed of a microcomputer which has output ports P1 and P2 and input port P3. While carriage 14 is moving in the direction of arrow A for printing, unit 40 delivers, through first output port P1, high-level transport signal Sa with a duration corresponding to print data for an entire line when thermal head 10 reaches the print start position of the line to be printed. Also, unit 40 activates second output port P2 when a signal applied to input port P3 goes low. While carriage 14 is moving in the direction of arrow B for printing, moreover, the main control unit delivers, through port P2, high-level transport signal Sb with the duration corresponding to the one-line print data when head 18 reaches the print start position of the line. Control device 39 includes take-up control signal output circuit 41 which is formed of a monostable multivibrator including time constant circuit 42. Input terminal X of output circuit 41 is connected to port P1 of unit 40, and its output terminal Q to one input terminal of OR circuit 43. When a signal applied to input terminal X goes low, circuit 41 is triggered to supply, through output terminal Q, high-level take-up control signal Sm with a duration determined by time constant circuit 42. The other input terminal of OR circuit 43 is connected to output port P1 of main control unit 40, while its output terminal is connected to input port P3 of circuit 43 and forward-rotation terminal W1 of driver circuit 44 for driving ribbon transport motor 36. Output port P2 of unit 40 is connected to reverse-rotation terminal W2 of circuit 44. If a high-level signal is applied to terminal W1, circuit 44 drives motor 36 forward or in the counterclockwise direction of FIG. 5 for the duration of the input signal. If a high-level signal is applied to terminal W2, on the other hand, the driver circuit drives motor 36 reversely for the duration of the signal.

The operation of the printer, constructed in this manner, will now be described.

Figures 9A, 9B, 9C, 9D:
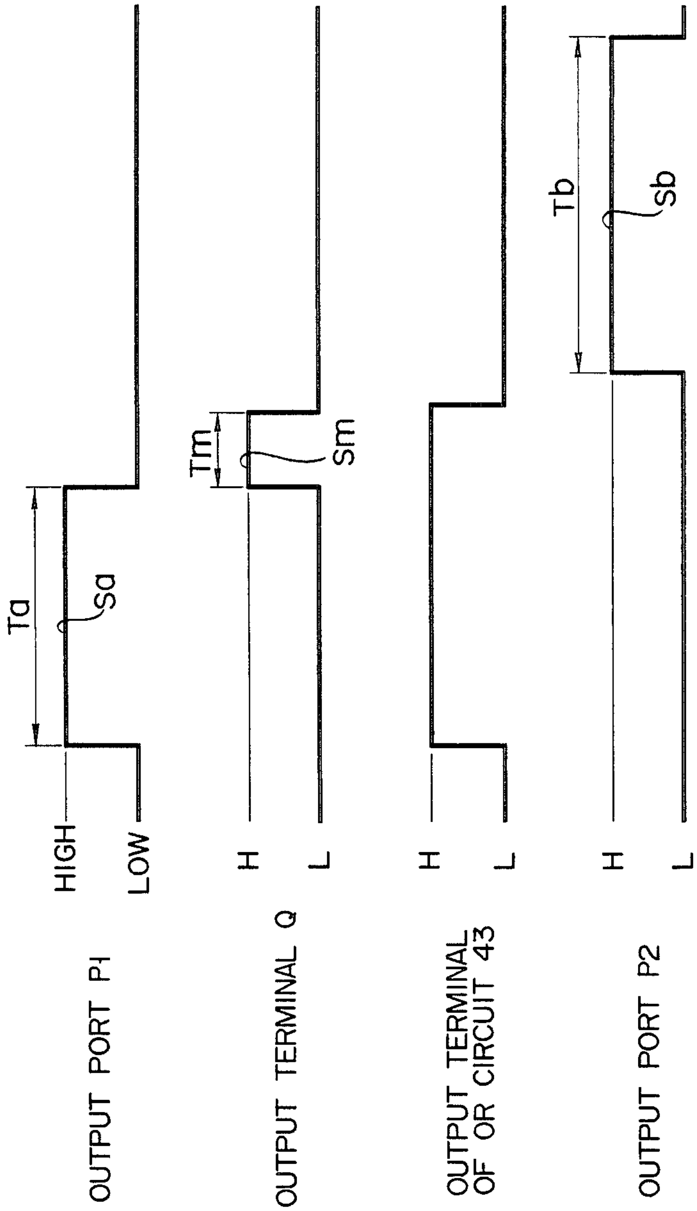
Figure 10:
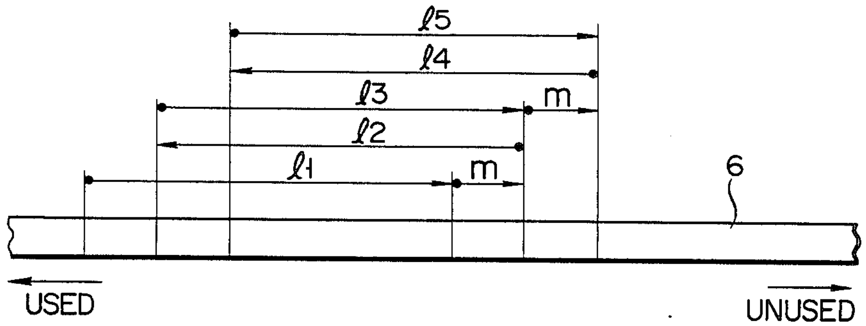

Suppose the lengths of print data for the first to fifth lines to be printed, i.e., the lengths of ink ribbon portions required for the printing of the individual lines, are l1, l2, l3, l4 and l5, respectively, as shown in FIG. 10. In ribbon cassette 2, as shown in FIG. 1, first reel 4 takes up the used portion of ribbon 6, while second reel 5 delivers the unused ribbon portion. In printing the first line, head support plate 17 is rocked by control lever 20 so that thermal head 18 is pressed against paper 8 at the print start position of the first line. Then, head 18 is energized to be heated, and carriage 14 moves together with the head in the direction of arrow A. At this time, transport control signal Sa with duration Ta (FIG. 9A) corresponding to the print data for the first line is delivered from output port P1 of main control unit 40. Signal Sa is applied to forward-rotation terminal W1 of driver circuit 44 through OR circuit 43, and also to take-up control signal output circuit 41. As a result, ribbon transport motor 36 is driven in the forward direction, so that first gear 31 rotates in the counterclockwise direction of FIG. 5, thereby transporting ribbon 6 in the direction of arrow a. Thus, while carriage 14 is moving in the direction of arrow A for printing, the ink ribbon is transferred without moving relatively to the paper 8. When printing for the first entire line or length l1 is completed, thermal head 18 is deenergized, and transport control signal Sa ceases to be outputted. When signal Sa goes low, output circuit 41 is triggered to deliver high-level take-up control signal Sm with duration Tm (FIG. 9B) through output terminal Q. Signal Sm is applied to forward-rotation terminal W1 of driver circuit 44 and input port P3 of main control unit 40 through OR circuit 43. Thus, the input level of the signal at terminal W1 of circuit 44 and port P3 of unit 40 is kept high (FIG. 9C). Circuit 44 continues to drive motor 36 counterclockwise for duration Tm of control signal Sm after head 18 is disconnected from the power supply. As a result, the starting end side of ink ribbon 6 is further wound on first reel 4 for length l corresponding to signal Sm. Length m is given by $m=(l/n)\times 2$, where l is the maximum length of one-line, and n is the limit frequency of repeated use of ink ribbon 6.

When control signal Sm ceases to be outputted, the signal level at input port P3 of main control unit 40 goes low, so that output port P2 is activated. After the printing of the first line is finished, the printing paper is fed for a predetermined distance by paper feed motor 24 and roller 26. Subsequently, printing for the second line is effected by moving carriage 14 in the direction of arrow B. At this time, if the print end position of the first line coincides with the print start position of the second line, thermal head 18 is energized to be heated at that position. If the end position of the preceding line is not coincident with the start position of the following one, head 18 is energized and heated after being moved to its start position. Then, high-level transport control signal Sb with duration Tb (FIG. 9D) is delivered from output port P2 of unit 40. As a result, second reel 5 is rotated clockwise while carriage 14 moves in the direction of arrow B. Thus, ribbon 6 is fed in the direction of arrow b of FIG. 1 for the printing of the second line. Also while carriage 14 is moving in the direction of arrow B for printing, ribbon 6 is kept from moving relatively to the paper. When the printing of the second line for length l2 is completed, the paper is fed for the predetermined distance, and transport control signal Sa is delivered from output port P1 of main control unit 40. Then, printing of the third line for length l3 is performed in the same manner as in the printing of the first line. When the printing of the third line is finished, that is, when signal Sa ceases to be outputted, take-up control signal Sm is delivered from control signal output circuit 41, and the starting end side of ribbon 6 is taken up for length l in the manner as aforesaid.

These operations are repeated for printing of subsequent lines. In the embodiment described above, the starting end side of ribbon 6 is wound or taken up for length m at the end of the printing of every other line or the printing during the advance of carriage 14.

According to the printer constructed in this manner, printing is effected during both advancing and returning strokes of the carriage, so that the printing time can be shortened and the ribbon cassette requires no reloading. Moreover, the starting end side of the ink ribbon is taken up for a predetermined length when the printing of every other line ends. Therefore, printing can be performed continuously without any prolonged interruption which is caused in the conventional case where the used portion of the ink ribbon is taken up at a stroke after the frequency limit of its repeated use is reached. Moreover, the repetitions of use of the ribbon need not be counted, and arouse no problems if the printer is disconnected from the power supply during a printing operation. Thus, the control circuit may be simplified in configuration.

The ribbon transport mechanism is constructed so that the single ribbon transport motor is rotated in both forward and reverse directions, thereby alternatively driving the first or second reel of the cassette. Thus, the printer may enjoy a lower manufacturing cost than in the case where the first and second reels are driven separately by different motors. Since take-up control signal output circuit 41 is formed of a monostable multivibrator, the main control unit, formed of a microcomputer, need not be programmed for take-up control. Also, the use of the input and output ports of the main control unit may be reduced in frequency.

Figure 11:
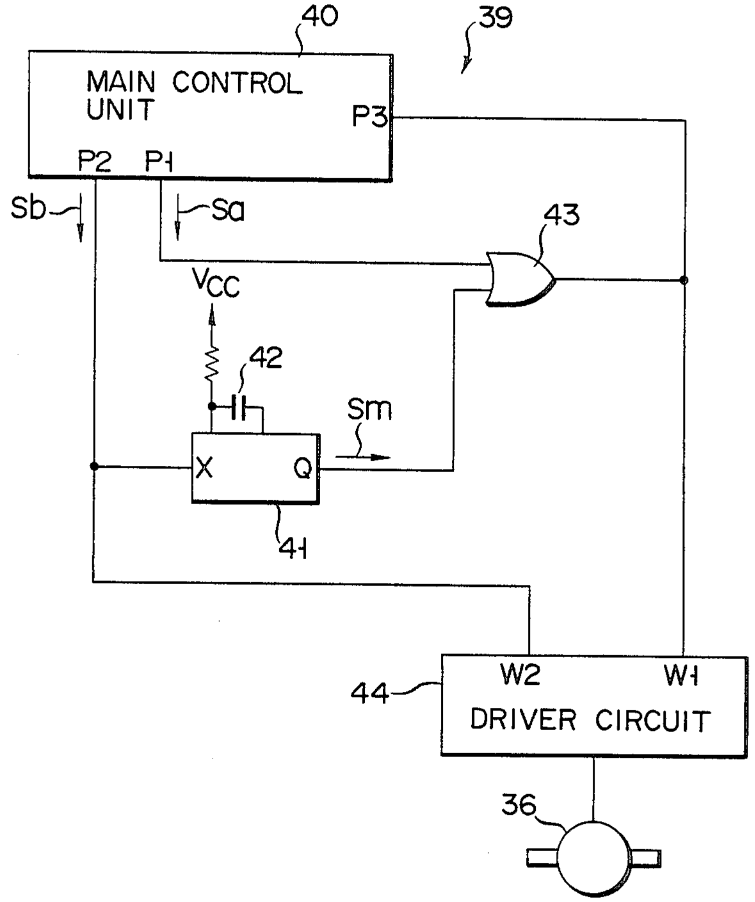
Figure 12:
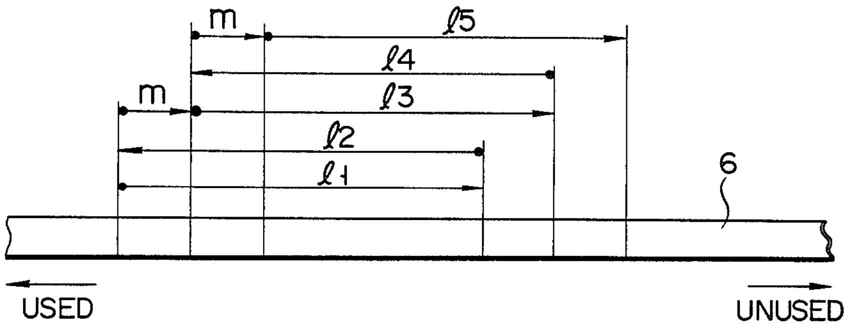

FIGS. 11 and 12 show a first modification of the control device. This modified example differs from the above described embodiment in that input terminal X of take-up control signal output circuit 41 is connected to output port P2 of main control unit 40. In this example, as shown in FIG. 12, the starting end side of the ink ribbon is taken up for length m at the end of each printing during the return of carriage 14. This modification provides the same effects as the above embodiment.

Figure 13:
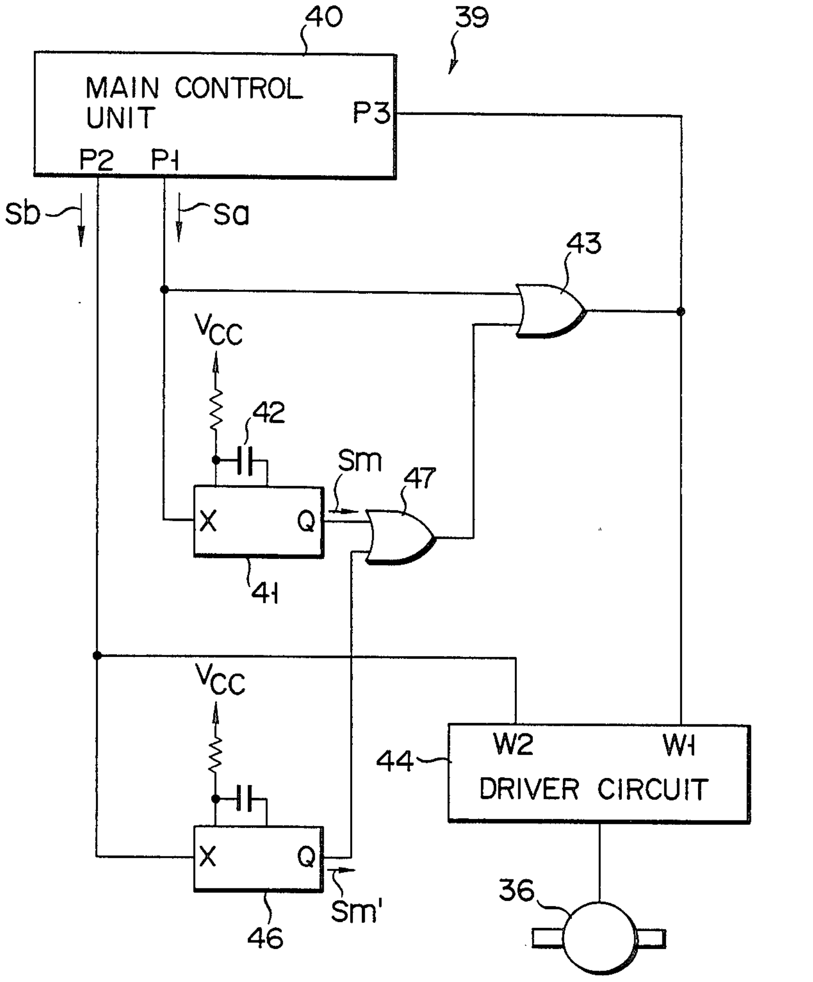
Figure 14:
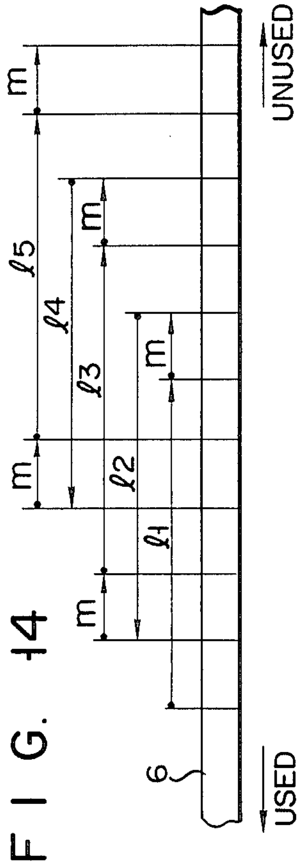
Figure 15:
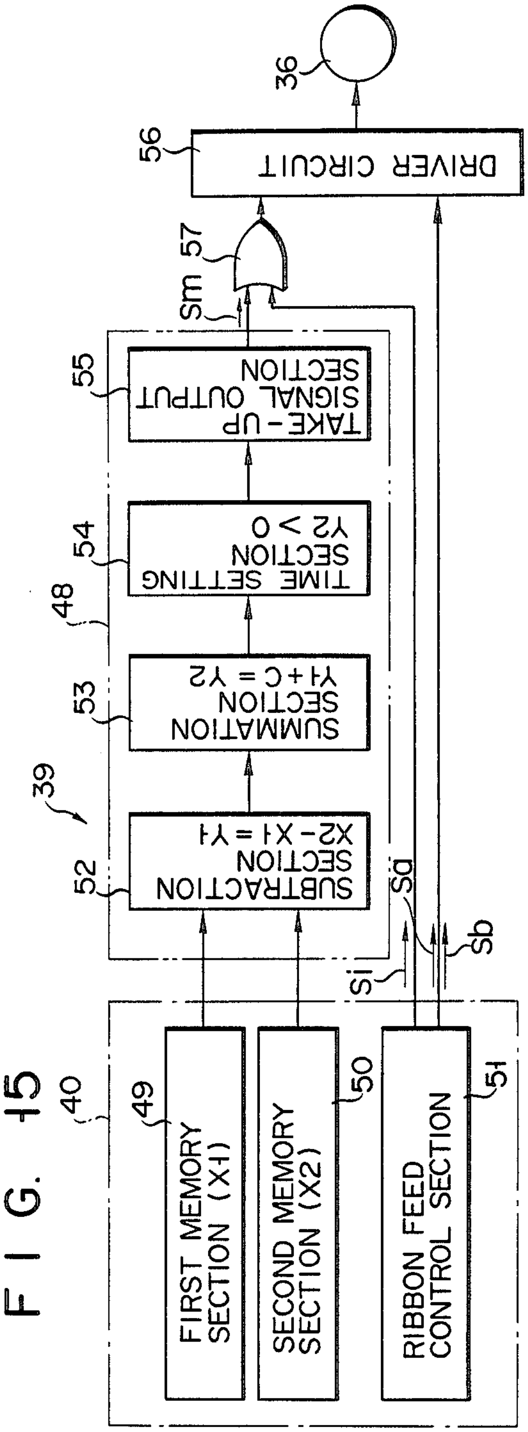

FIGS. 13 and 14 show a second modification of the control device. In this modified example, take-up control signal output circuit 46 and OR circuit 47 are provided besides the ones used in the control device of the above embodiment. Output terminal Q of control signal output circuit 41 is connected to OR circuit 43 through OR circuit 47. Input terminal X of second output circuit 46 is connected to output port P2 of main control unit 40, and its output terminal Q to circuit 47. According to control device 39 constructed in this manner, even when the output of transport control signal Sb from port P2 of unit 40 is stopped, take-up control signal Sm' is supplied from circuit 46 to terminal W1 of driver circuit 44. Thus, according to this example, the starting end side of the ink ribbon is taken up for length m at the end of printing of each line. In this example, length m is given by $m=(l/n)$, where l is the maximum length of one-line, and n is the limit frequency of repeated use of ink ribbon 6.

FIGS. 15 to 20 show a second embodiment of the present invention. The second embodiment differs from the first one only in the construction of control device 39. As regards the other sections, the two embodiments have the same construction.

Control device 39, which is formed of a microcomputer, comprises main print control unit 40 and ribbon take-up control unit 48. Unit 40 includes first memory section 49 for successively storing printed character number data X1 (print length) for each previously printed line in accordance with the input print data, second memory section 50 for successively storing printed character number data X2 for each following line, and ribbon transport control section 51 for supplying transport signal Si responsive to number data X2 stored in section 50 and signal Sa or Sb for forward or reverse motor rotation. Ribbon take-up control unit 48 includes subtraction section 52 for calculating difference Y1 by subtracting one-line character number data X1 in memory section 49 from one-line character number data X2 in memory section 50, summation section 53 for calculating take-up length Y2 by adding predetermined constant C to difference Y1 delivered from section 52, time setting section 54 for supplying a time signal responsive to the sum or length Y2 from section 52 on condition that the sum is positive, and take-up signal output section 55 for delivering take-up signal Sm responsive to the time signal. Constant C, which is previously set in summation section 53, is given by C=l/n, where l is the maximum length of one-line character number data, and n is the limit frequency of repeated use of ink ribbon 6. Control device 39 further comprises driver circuit 56 for driving ribbon transport motor 36. Circuit 56 receives transport signal Si from ribbon transport control section 51 and take-up signal Sm from ribbon take-up control unit 48 through OR circuit 57, and drives motor 36 in the rotating direction corresponding to the duration and printing direction which are responsive to these signals.

The operation of the second embodiment with the aforementioned construction will now be described.

Figure 16:
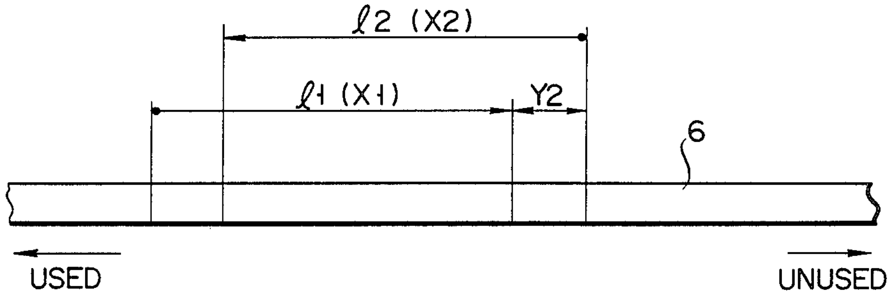

First, in printing with carriage 14 moving in the direction of arrow A (FIG. 5), transport signal Si and forward-rotation signal Sa responsive to one-line character number data X2 stored in second memory section 50 are supplied from ribbon transport control section 51 to ribbon transport motor 36. As a result, motor 36 is driven in the counterclockwise direction of FIG. 5. Thus, first gear 31 is rotated counterclockwise to transport ink ribbon 6 in the direction of arrow a of FIG. 1. While carriage 41 is moving in the direction of arrow A for printing, therefore, ribbon 6 is prevented from moving relatively to the printing paper. When one entire line l1 is printed, its character number data, as data X1, is transferred to and stored in first memory section 49, while character number data X2 of line l2 to be printed next is stored in second memory section 50. If data X1 on printed line l1 and data X2 on next line l2 are equivalent, as shown in FIG. 16, take-up length Y2 calculated by subtraction section 52 and summation section 53 is Y2=C. Based on length Y2, motor 36 is driven counterclockwise, so that ribbon 6 is taken up for length Y2 (or C) in the direction of arrow a.

Subsequently, next line l2 is printed. In this case, thermal head 18 is pressed against the printing paper, and transport signal Si and reverse-rotation signal Sb corresponding to character number X2 for line l2 are supplied from ribbon transport control section 51. Accordingly, carriage 14 is moved in the direction of arrow B, and second gear 32 is rotated clockwise. As a result, ink ribbon 6 is transported in the direction of arrow b of FIG. 1 for printing line l2. Thereafter, data X2 in second memory section 50 is transferred to and stored, as character number data X1, in first memory section 49, while subsequent character number data X2 is stored in second memory section 50, in the same manner as aforesaid. Then, take-up length Y2 is calculated, and ribbon 6 is taken up by first reel 4. These processes of operation are repeated for the printing of a desired number of lines.

Figure 17:
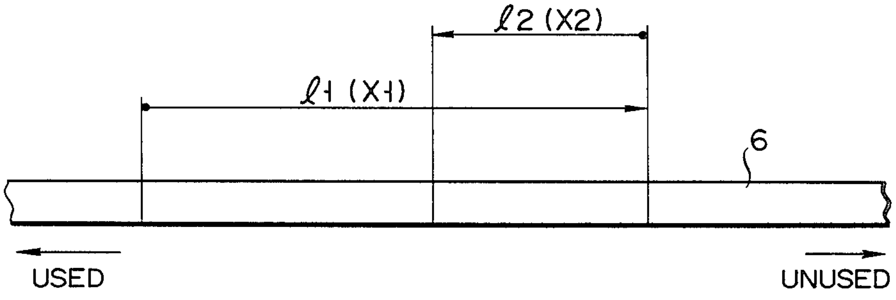
Figure 18:
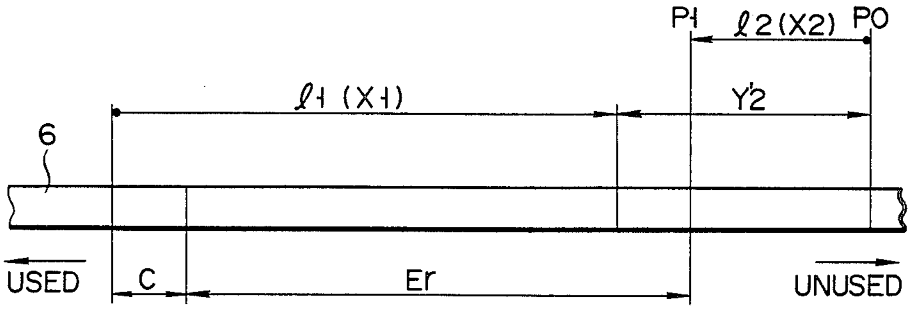

In the printing operation described above, if character number data X1 for line l1 corresponding to the movement of carriage 14 in the direction of arrow A is much greater than data X2 for next line l2, as shown in FIG. 17, then take-up length Y2 is negative, and the ink ribbon will not be taken up. Thus, the ribbon cannot excessively be taken up. As shown in FIG. 18, absolute value Y2' of length Y2 is greater than number data X2. If ink ribbon 6 is actually taken up for value Y2', print start point and print end point for next line l2 are located at positions P0 and P1, respectively. Therefore, ribbon 6 is taken up in vain without offering its printable area Er for use in the printing of any lines following line l2. Thus, the ribbon cannot be used up, producing substantial waste especially when the aforesaid printing mode continues. According to this embodiment, as seen from comparison between FIGS. 17 and 18, such wasteful use of the ribbon can be avoided, leading to a higher coefficient of utilization.

Figure 19:
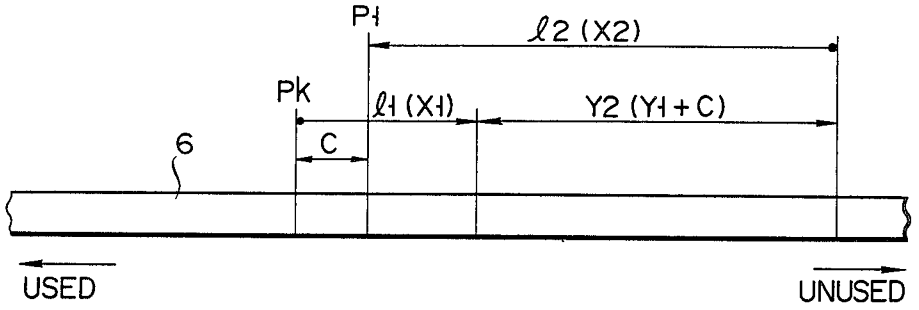
Figure 20:
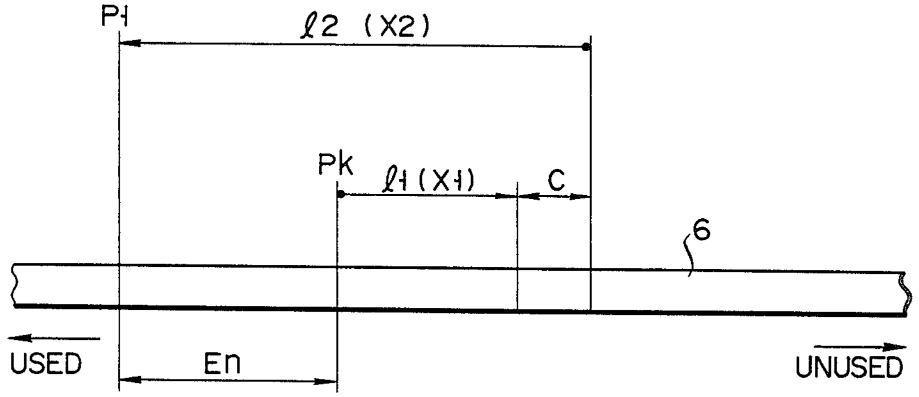
Figure 23:
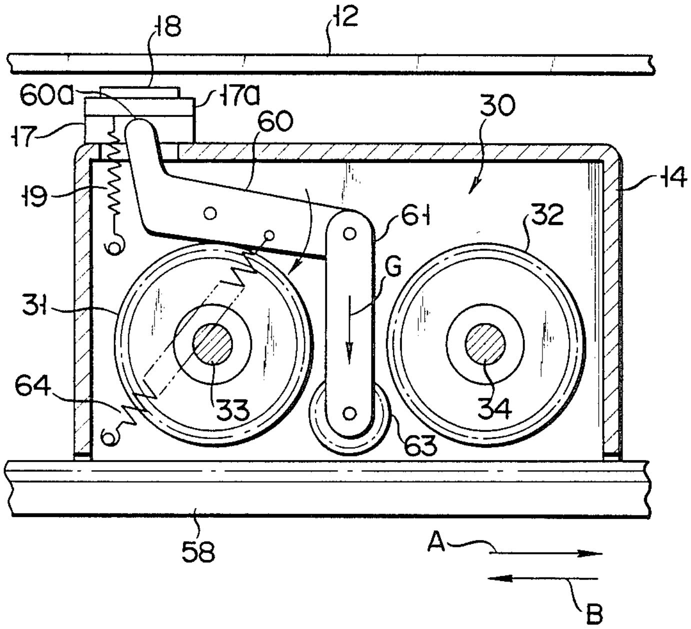
Figure 24:
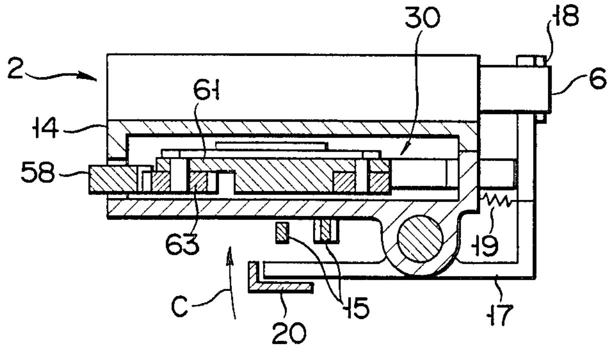

Moreover, if character number data X1 of preceding line l1 is considerably smaller than data X2 of line l2 to be printed with carriage 14 moving in the direction of arrow B, as shown in FIG. 19, take-up length Y2 takes a positive value given by Y2=Y1+C. Accordingly, print end position P1 of ink ribbon 6 for line l2 is deviated to the unused side of the ribbon from print start point Pk for line l1 by predetermined distance C. Thus, ribbon 6 can be prevented from being excessively used beyond its frequency limit of use. If take-up length Y2 is adjusted to constant value C, print end point P1 of line l2 is located on the used side of ribbon 6 with respect to print start point Pk of preceding line l1, reaching to a substantial distance from point Pk. As a result, region En of ribbon 6 undergoes excessive use beyond its limit, producing nonprintable portions after continuation of the printing mode. According to this embodiment, as seen from comparison between FIGS. 19 and 20, the excessive use of the ribbon can be avoided, and therefore, nonprintable portions can be prevented.

According to the second embodiment, as described above, the ink ribbon is taken up in accordance with the difference obtained by subtracting the print length of each preceding line from that of the subsequent line at the end of one-line printing. Thus, the printing operation can be performed continuously without any wasteful or excessive use of the ribbon, in contrast with the case where the used ribbon portion is taken up at a stroke after the ribbon has reached the frequency limit of its repeated use. In consequence, the coefficient of utilization of the ribbon is improved, and a formation of nonprintable portions can be prevented.

In the second embodiment, moreover, ribbon 6 is taken up in one direction on condition that take-up length Y2 is positive. Alternatively, however, the ribbon may be taken up in the other direction in accordance with length Y2 when the value becomes negative. In this case, the used side of the ribbon can be taken up by predetermined value C at the end of each line. Thus, wasteful use of the ribbon can be prevented more effectively.

FIGS. 21 to 26 show a third embodiment of the present invention. This embodiment differs from the first embodiment only in the construction of the ribbon transport mechanism. In the description to follow, like reference numerals are used to designate like portions as in the first embodiment.

Figure 25:
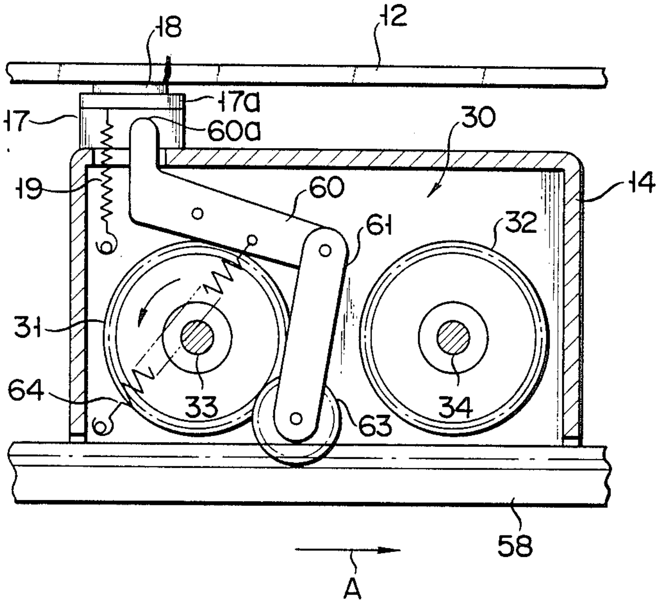
Figure 26:
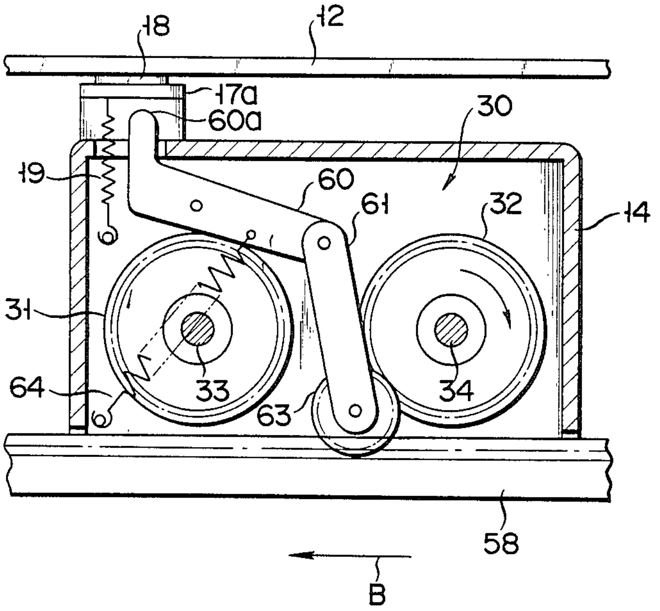

In a printer according to the third embodiment, as shown in FIGS. 21 to 24, rack 58 is mounted on frame 11, extending in the moving direction of carriage 14, and the ribbon transport motor is omitted. Carriage 14 contains therein first lever 60 the middle portion of which is supported for rotating. End 60a of the lever is opposed to head mounting portion 17a of head support plate 17 on which thermal head 18 is fixed. One end of second lever 61 is rotatably mounted on end 60b of lever 60. Pinion 63 is rotatably mounted on the other end of lever 61, located beside rack 58 and between first and second gears 31 and 32. First lever 60 is urged to rotate clockwise by spring 64 so that its end 60a abuts against the back of mounting portion 17a. Thus, when plate 17 is rocked in the direction of arrow C of FIG. 24, the first lever rotates clockwise. As a result, second lever 61 and pinion 63 move in the direction of arrow G of FIG. 23, so that the pinion engages rack 58. If carriage 14 is moved in the direction of arrow A with pinion 63 and rack 58 in mesh, the pinion moves in the opposite direction to the direction of arrow A to engage first gear 31, as shown in FIG. 25. If carriage 14 is moved in the direction of arrow B, pinion 63 moves in the direction of arrow A to engage second gear 32, as shown in FIG. 26.

The operation of the ribbon transport mechanism, constructed in this manner, will now be described. Let it be supposed, for example, that the first to fifth lines, as shown in FIG. 10, are printed as in the first embodiment. Hereupon, take-up length m on the used side of ink ribbon 6 is supposed to be $m=(l1/n)\times 2$, where l is the maximum length of one-line, n is the limit frequency of repeated use of the ribbon, and the ribbon is taken up at the end of printing of every two lines. First, with thermal head 18 pressed against the printing paper and energized, carriage 14 is moved in the direction of arrow A. As a result, pinion 63 engages rack 58 and first gear 31, as shown in FIG. 25, and is rotated by rack 58 as carriage 14 moves in that manner. Thereupon, first gear 31 rotates counterclockwise to transport ribbon 6 in the opposite direction to the direction of arrow A. Thus, ribbon 6 is prevented from moving relatively to the paper while carriage 14 is moving in the direction of arrow A for printing. When the first line is printed for ribbon length l1, thermal head 18 is deenergized, and carriage 14 is further moved in the direction of arrow A by a distance equivalent to take-up length m, with the head kept in contact with the paper. Accordingly, first gear 31 continues to rotate counterclockwise, so that the used side of ink ribbon 6 is taken up for length m in the counterclockwise direction.

Thereafter, head support plate 17 rocks so as to separate thermal head 18 from the printing paper, so that pinion 63 is disengaged from rack 58. In this state, carriage 14 is moved to the print start position of the second line, and head 18 is then pressed against the paper and energized. Then, the carriage is moved in the direction of arrow B, and second gear 32 is rotated clockwise by pinion 63, as shown in FIG. 26. Accordingly, ribbon 6 is transported in the opposite direction to the direction of arrow B, so that it is prevented from moving relatively to the paper while carriage 14 is moving in the direction of arrow B. When the printing of the second line ends, carriage 14 is moved in the direction of arrow A directly from the print end position of the line. Thereupon, the third line starts to be printed in the same manner as the first one. The individual lines are printed in succession by repeating these processes of operation, and the starting end side of the ribbon is taken up for length m at the end of printing of every two lines, that is, at the end of every advancing stroke of the carriage. The printing operation is accomplished by controlling the operation of carriage drive motor 16 by means of control device 39 shown in FIG. 7.

According to the third embodiment constructed in this manner, ribbon transport mechanism 30 includes first and second gears 31 and 32 connected individually to the paired reels of ribbon cassette 2, rack 58 extending in the moving direction of carriage 14, and pinion 63 adapted to be rotated by rack 58 as carriage 14 moves. Pinion 63 engages and rotates first and second gears 31 during the advancing and returning strokes, respectively, of carriage 14. This transport mechanism can transport the ink ribbon and take up its used side without requiring such an independent motor as is used to drive the first or second gear in the first embodiment. Thus, the exclusive-use motor for the reels may be omitted, permitting reduction in manufacturing cost.

In taking up the used side of the ink ribbon at the end of the movement of carriage 14 in the direction of arrow A for forward printing, transport mechanism 30 may be operated as follows. After the printing in the direction of arrow A ends, pinion 63 is disengaged from rack 58, and carriage 14 is returned by a distance equivalent to take-up length m in the direction of arrow B. Then, after pinion 63 is caused to engage rack 58 again, carriage 14 is moved for length m in the direction of arrow A, thereby taking up the starting end side of ribbon 6.

In the third embodiment, moreover, the used side of ink ribbon 6 may be taken up at the end of the printing during the returning stroke of carriage 14 (printing of line l2), as shown in FIG. 12. In this case, head support plate 17 is rocked so that thermal head 18 separates from the printing paper at the print end position of the returning stroke of carriage 14. Thus, pinion 63 is disengaged from rack 58. After carriage 14 is moved for take-up length m in the direction of arrow B, head 18 is rock to the position where it is pressed against the paper, and pinion 63 engages rack 58. Thereafter, carriage 14 is moved for length m in the direction of arrow A from this position, so that the starting end side of ribbon 6 is taken up for length m. Then, after head 18 is energized, carriage 14 is moved as it is in the direction of arrow A for the printing of the next line.

Alternatively, in the third embodiment, the used side of ribbon 6 may be taken up for length m at the end of the printing of any line, as shown in FIG. 14.

Figure 27:
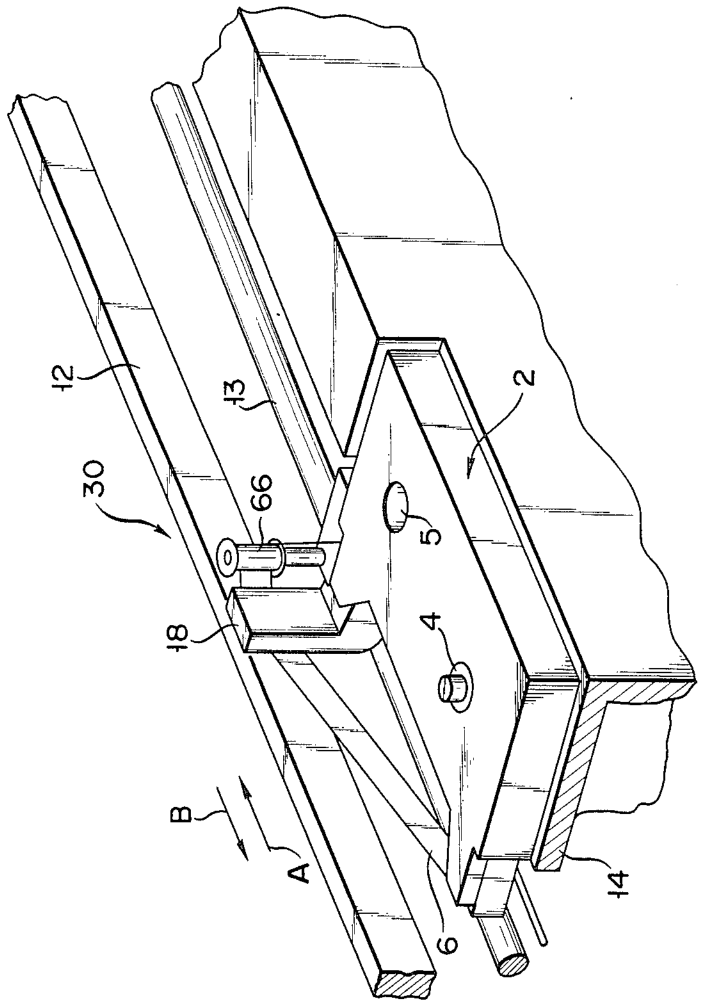
FIG. 27 is a perspective view showing the principal part of a printer according to a fourth embodiment of the invention.

FIG. 27 shows a fourth embodiment of the present invention. According to this embodiment, carriage 14 is fixed immovably, and thermal head 18 only is allowed to reciprocate along guide rod 13. Ribbon transport mechanism 30 includes rotatable guide roller 66 movable together with head 18 and a motor (not shown) for driving first and second reels 4 and 5 in ribbon cassette 2.

When moving thermal head 18 in the direction of arrow A for printing, first reel 4 is kept nonrotatable, while second reel 5 is allowed to rotate freely. Ink ribbon 6 is drawn out from reel 5 by guide roller 66 which moves as one with head 18. In doing this, the ribbon is controlled so as not to move relatively to the printing paper. When moving head 18 in the direction of arrow B for printing, on the other hand, reel 4 is kept nonrotatable, while reel 5 is rotated by a reel drive motor to take up the ribbon drawn out in the previous step of printing. After the printing in the direction of arrow A or B ends, first reel 4 is driven to take up the starting end side of ribbon 6 for predetermined length m.

It is to be understood that the present invention is not limited to the embodiments described above, and that various changes and modifications may be effected therein by one skilled in the art without departing from the scope or spirit of the invention.

What is claimed is:

1. A thermal-transfer printer for printing input information on a record medium by using a ribbon cassette which includes a pair of reels and a repeatedly usable ink ribbon wound on the reels, comprising:

thermal head means arranged for reciprocation along the record medium, for, during both advancing and returning strokes, heating the ink ribbon to thermally transfer ink of the ribbon to the record medium in accordance with the input information, thereby printing lines alternately in advancing and returning directions;

ribbon transport means for rotating the reels to transport the ink ribbon in a desired direction; and control means for supplying a transport control signal to said ribbon transport means to transport the ink ribbon in a predetermined direction so that the ink ribbon does not move relatively to the record medium during the printing by the thermal head, and for supplying a take-up control signal to said ribbon transport means so that so that the starting end side of the ribbon is taken up for a predetermined length every time one line or a few lines are printed.

2. The printer according to claim 1, wherein said control means includes a main control unit for supplying the transport control signal to said ribbon transport means to drive the reels so that the ink ribbon is transported in the direction opposite to the moving direction of the thermal head, and a take-up control signal output circuit for supplying the take-up control signal to said ribbon transport means to drive the reels so that the starting end side of the ribbon is taken up for the predetermined length at the end of each printing in the advancing direction of the thermal head.

3. The printer according to claim 2, wherein said predetermined length is given by $(l/n)\times 2$, where l is the maximum length of one-line, and n is the limit frequency of repeated use of the ink ribbon.

4. The printer according to claim 1, wherein said control means includes a main control unit for supplying the transport control signal to said ribbon transport means to drive the reels so that the ink ribbon is transported in the direction opposite to the moving direction of the thermal head, and a take-up control signal output circuit for supplying the take-up control signal to said ribbon transport means to drive the reels so that the starting end side of the ribbon is taken up for the predetermined length at the end of each printing in the returning direction of the thermal head.

5. The printer according to claim 1, wherein said control means includes a main control unit for supplying the transport control signal to said ribbon transport means to drive the reels so that the ink ribbon is transported in the direction opposite to the moving direction of the thermal head, and a take-up control signal output circuit for supplying the take-up control signal to said ribbon transport means to drive the reels so that the starting end side of the ribbon is taken up for the predetermined length at the end of each printing in either of the advancing and returning directions of the thermal head.

6. The printer according to claim 5, wherein said predetermined length is given by $(l/n)$, where l is the maximum length of one-line, and n is the limit frequency of repeated use of the ink ribbon.

7. The printer according to claim 1, wherein said control means includes a main control unit for supplying the transport control signal to said ribbon transport means to drive the reels so that the ink ribbon is transported in the direction opposite to the moving direction of the thermal head, and a ribbon take-up control unit for supplying the take-up control signal, which corresponds to the difference obtained by subtracting the length of any line from that of the next line, to said ribbon transport means to drive the reels so that the starting end of the ribbon is taken up for a length represented by the take-up control signal.

8. The printer according to claim 7, wherein said main control unit includes a first memory section for storing the print length of each line and a second memory section for storing the print length of each next line, and said ribbon take-up control unit includes a subtraction section for subtracting the print length stored in the first memory section from the print length stored in the second memory section to provide the difference, a summation section for adding a predetermined constant based on the frequency limit of repeated use of the ink ribbon to the difference, thereby calculating the take-up length, a time setting section for supplying a time signal responsive to the take-up length if the takeup length is positive, and a take-up signal output section for supplying a take-up signal responsive to the time signal to said ribbon transport means.

9. The printer according to claim 8, wherein said predetermined constant is given by $(l/n)$, where l is the maximum length of one-line, and n is the limit frequency of repeated use of the ink ribbon.

10. The printer according to claim 1, wherein said ribbon transport means includes a reversible transport motor for alternatively rotating the first and second reels in accordance with the transport control signal and the take-up control signal from the control device.

11. The printer according to claim 10, which further comprises a carriage supporting the ribbon cassette and the transport motor and movable in one with the thermal head, and drive means for moving the carriage.

12. The printer according to claim 1, which further comprises a carriage supporting the ribbon cassette and movable in one with the thermal head, and wherein said ribbon transport means includes drive means for reciprocating the carriage and the thermal head as one, and a power transmission mechanism for transmitting the driving force of the drive means alternatively to the first and second reels to rotate the same.

13. The printer according to claim 12, wherein said drive means includes a reversible drive motor driven in accordance with the transport control signal and the take-up control signal from the control device, and said power transmission mechanism includes first and second gears rotatably supported on the carriage and individually engaging the paired reels, a rack extending in the moving direction of the carriage, and a pinion rotatably supported on the carriage and rotated by the rack as the carriage moves, said pinion being adapted to engage the first gear to rotate the same during the advancing stroke of the carriage and to engage the second gear to rotate the same during the returning stroke of the carriage.

* * * * *